United States Patent [19]

Thorley

[11] 4,441,850

[45] Apr. 10, 1984

[54] AUXILIARY STEP FOR WHEELCHAIR LIFT

[75] Inventor: Graham R. Thorley, La Mesa, Calif.

[73] Assignee: Transporation Design Technology, Inc., San Diego, Calif.

[21] Appl. No.: 366,942

[22] Filed: Apr. 9, 1982

[51] Int. Cl.$^3$ .......................... B60P 1/46; B60R 3/00

[52] U.S. Cl. .................................. 414/545; 105/443; 182/166; 280/166; 414/921

[58] Field of Search ............... 414/540, 545, 556, 921; 280/166; 182/88, 91; 105/438, 443, 447, 448, 450

[56] References Cited

U.S. PATENT DOCUMENTS

| | | | |
|---|---|---|---|
| 661,453 | 11/1900 | Kratz | 280/166 |
| 2,146,668 | 2/1939 | Baade | 105/447 |
| 3,572,754 | 3/1971 | Fowlerr | 280/166 |
| 3,651,767 | 3/1972 | Findeklee | 280/166 |
| 3,672,311 | 6/1972 | Duba et al. | 182/88 X |
| 3,724,396 | 4/1973 | Roth | 105/450 X |
| 3,955,827 | 5/1976 | Wonigar | 280/166 |
| 4,020,920 | 5/1977 | Abbott | 182/19 |
| 4,022,337 | 5/1977 | Eichenhofer et al. | 414/921 |
| 4,164,292 | 8/1979 | Karkau | 414/545 |

*Primary Examiner*—Leslie J. Paperner
*Attorney, Agent, or Firm*—Charmasson & Holz

[57] ABSTRACT

An auxiliary step is provided principly for use with the type of wheelchair lift that mounts to buses and other passenger vehicles wherein the risers and horizontal panels of a step structure are extended horizontally to define a platform which can be raised up and down between the levels of the sidewalk and the floor of the passenger vehicle to permit the boarding and deboarding of passengers in wheelchairs. The lift structure for which the instant invention is primarily to be used defines two steps between the floor level of the vehicle and the sidewalk or passenger platform, and the instant invention defines a third auxiliary step which can be deployed above the highest step of the platform lift. The auxiliary step is more or less independent of the platform lift mechanism, except that it will alternatively deploy between a step mode wherein it defines a third step, and a vertical barrier mode in which it blocks the open space above the upper step of the platform lift structure when the latter is deployed as a lift, with the net effect of modifying the existing platform lift to accommodate passenger vehicles, such as trains and trolleys, in which the vehicle floor is sufficiently high above the sidewalk or boarding platform that three steps, rather than two, are required.

7 Claims, 6 Drawing Figures

AUXILIARY STEP FOR WHEELCHAIR LIFT

BACKGROUND OF THE INVENTION

The invention is in the field of devices aiding the handicapped, and particularly wheelchair passengers, to board and deboard vehicles, including commercial vehicles and private vans. Several styles of these devices are in use, and those developed by the inventor of the device disclosed herein are of the type wherein a fold-out step panel arrangement is used in which the step horizontal surfaces and risers are hinged together. When used as a step, the panels are folded into a step configuration, but can subsequently be used as a platform by extending the panels out horizontally on a carriage sttructure that also, once extended, can be hydraulically driven upwards or downwards to raise or lower a passenger in a wheelchair on the platform between the vehicle surface and the sidewalk or boarding platform.

Patents issued to the inventor and co-workers on this type of alternate step/platform lift mechanism include U.S. Pat. Nos. 4,081,091 issued 03/28/78; 4,027,807 issued 06/07/77; and 4,176,999 issued 12/04/79. Additionally, a pending application, Ser. No. 06/268,466 is a continuation-in-part of a Patent Cooperation Treaty Application which was in turn a coninuation-in-part of U.S. application Ser. No. 06/041,943, now U.S. Pat. No. 4,251,179.

These lifts work quite well and have been very sucessful in the marketplace. Their primary application lies in transit buses, private vans, and the transit company mini-buses that are used in some cities as an accommodation to the handicapped in place of equipping all of their buses with the wheelchair lift.

These lifts have been constructed to define two steps intermediate the vehicular floor and the passenger platform or sidewalk, which is ideal for buses and vans. However, in some trolleys and other rail vehciles, the distance between the vehicle floor and passenger platform is sufficiently great that another step is required, so that three steps are ideal.

Because the forerunner two-step lift structure has been engineered virtually to perfection, ideally, rather than re-engineering that basic concept to incorporate yet a third step, a better solution would lie in the provision of an auxiliary step to use in conjunction with the two-step lift.

SUMMARY OF THE INVENTION

The instant invention precisely fulfills the above stated need and constitutes an auxiliary, or third, step mechanism which is used above the upper of the two steps of the existing step platform structure. The auxiliary step is more or less independent of the platform mechanism, except that it obviously must be phased in its operation with the platform.

The entire apparatus has three basic modes. The first is the stowage mode in which neither the platform nor the steps are used but the apparatus is gathered up out of the way as far as is possible while the vehicle is in motion. In this mode, the platform mechanism is drawn up close underneath the auxiliary step element, which extends horizontally in its step mode.

In the second mode of operation, steps are defined by the platform apparatus. In this mode, the platform apparatus in its step confirguration is lowered beneath the auxiliary step of the instant invention, so that the latter provides the third step up from ground level.

In the third and final configuration, the platform structure is in its platform/lift mode. It extends out horizontally beneath the auxiliary step element, and the auxiliary step folds downwardly into the vertical position, while simultaneously a barrier panel swings into the vertical position beneath the auxiliary step element to define a continuous vertical barrier behind the lift structure to wall off what would otherwise be a gaping void between the floor of the train and the platform through which a handicapped person might well slip, all or in part.

The auxiliary step mechanism is more or less self-contained, being mounted in a rectangular frame which attaches onto the rear of the existing towers of the platform structure. This frame mounts a linear actuator which drives a yoke, simultaneously moving the auxiliary step element itself and the hoizontal barrier with which it cooperates in the barrier mode, between the modes of operation.

DETAILED DESCRIPTION OF THE PREFERRED EMBODIMENT

As indicated above in the background, the instant invention is used in conjunction with the platfom lift structure which is the subject of the patents indicated and the pending application. Insofar as the structure is described in those patents and the application, it is of course not part of this invention, and so the platform lift will be described only generally here, with the indicated patents and patent application being hereby incorporated by reference for the details of construction of the lift.

Generally speaking, the lift is mounted between a pair of upright towers 10 which are themselves mounted in the well of the passenger vehicle. A carriage 12, best seen in FIGS. 1, 3, and 5, moves up and down between the two towers, with control functions and hydraulic power being provided through junction box 14. The carriage moves from the stowed position shown in FIG. 1, down to a step mode indicated in FIG. 3 and 4, and finally into a platform mode, the lower position of which is illustrated in FIGS. 5 and 6 wherein the platform is aligned with the sidewalk or boarding area, the raised position being shown in phantom.

Figure 5:
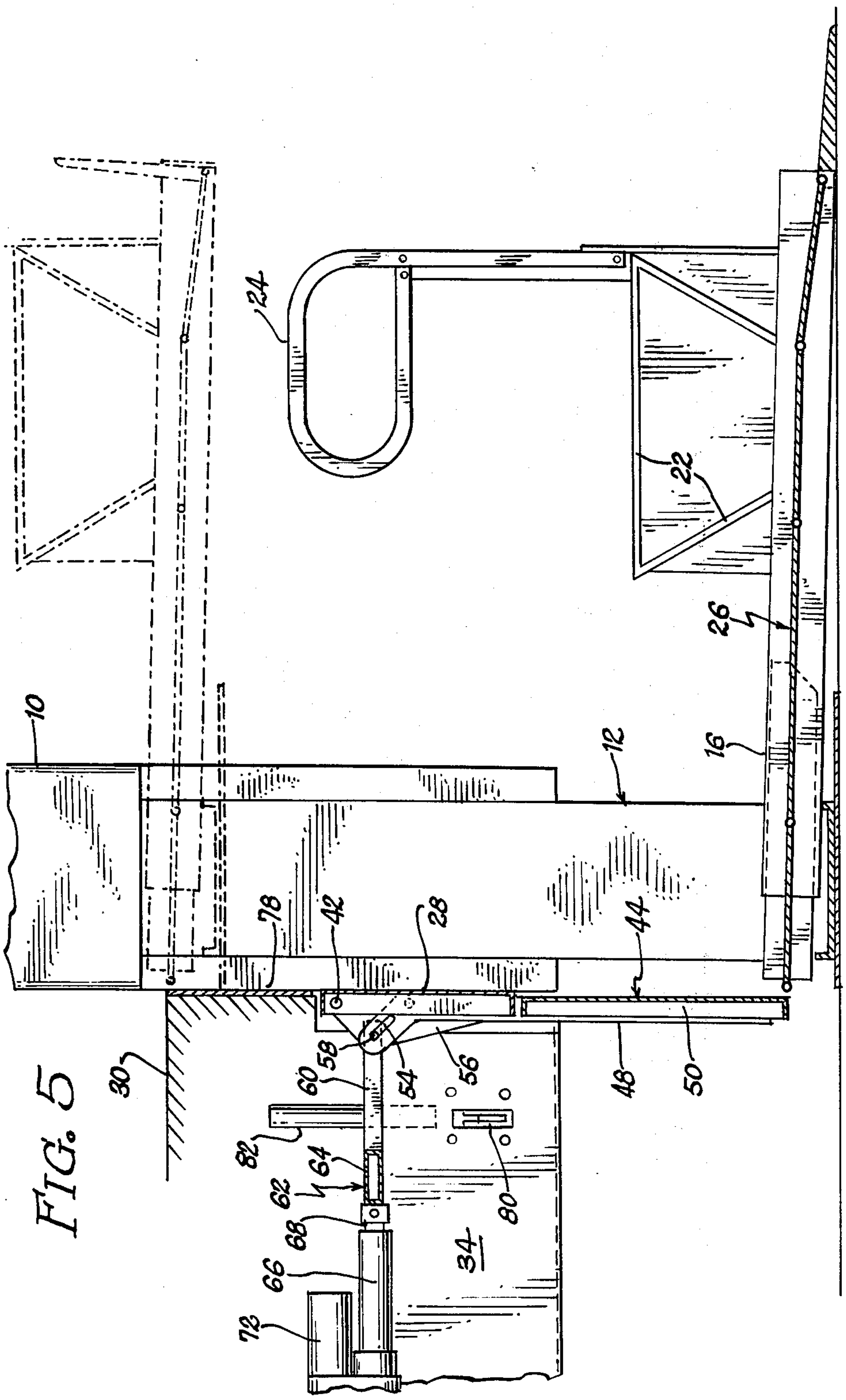
FIG. 5 is an elevation section of the step mechanism in its lift or platform position; and, FIG. 6 is a plan form view of the apparatus extended as in FIG. 5.
Figure 6:
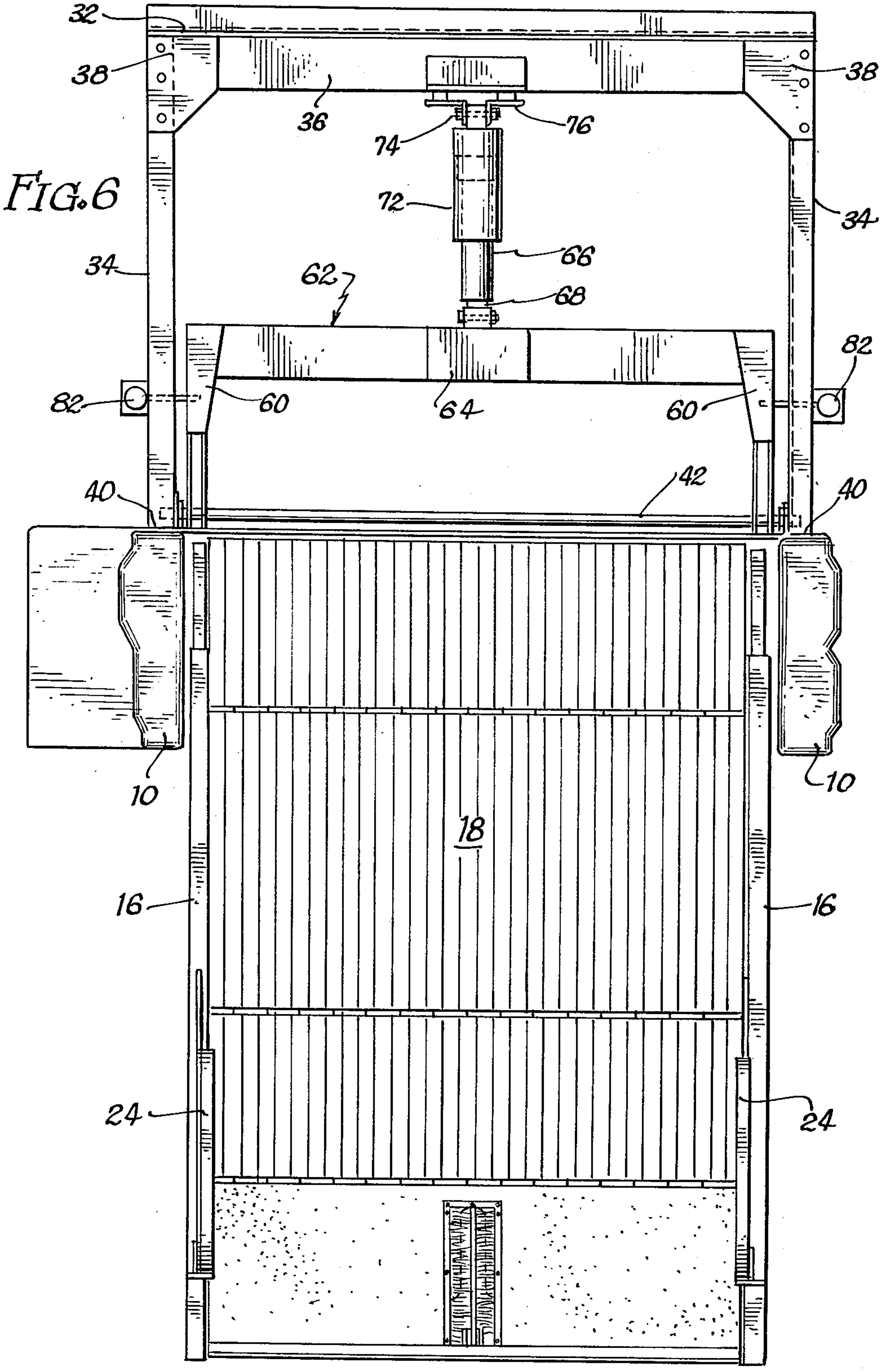

In addition to the up and down motion, the carriage moves out and back by virtue of its being slidably mounted on rails 16, best seen in FIG. 5. These rails are fixedly mounted on the elevator structure operated by the towers, and the carriage slides in and out on the rails as the rails move up and down.

Figure 1:
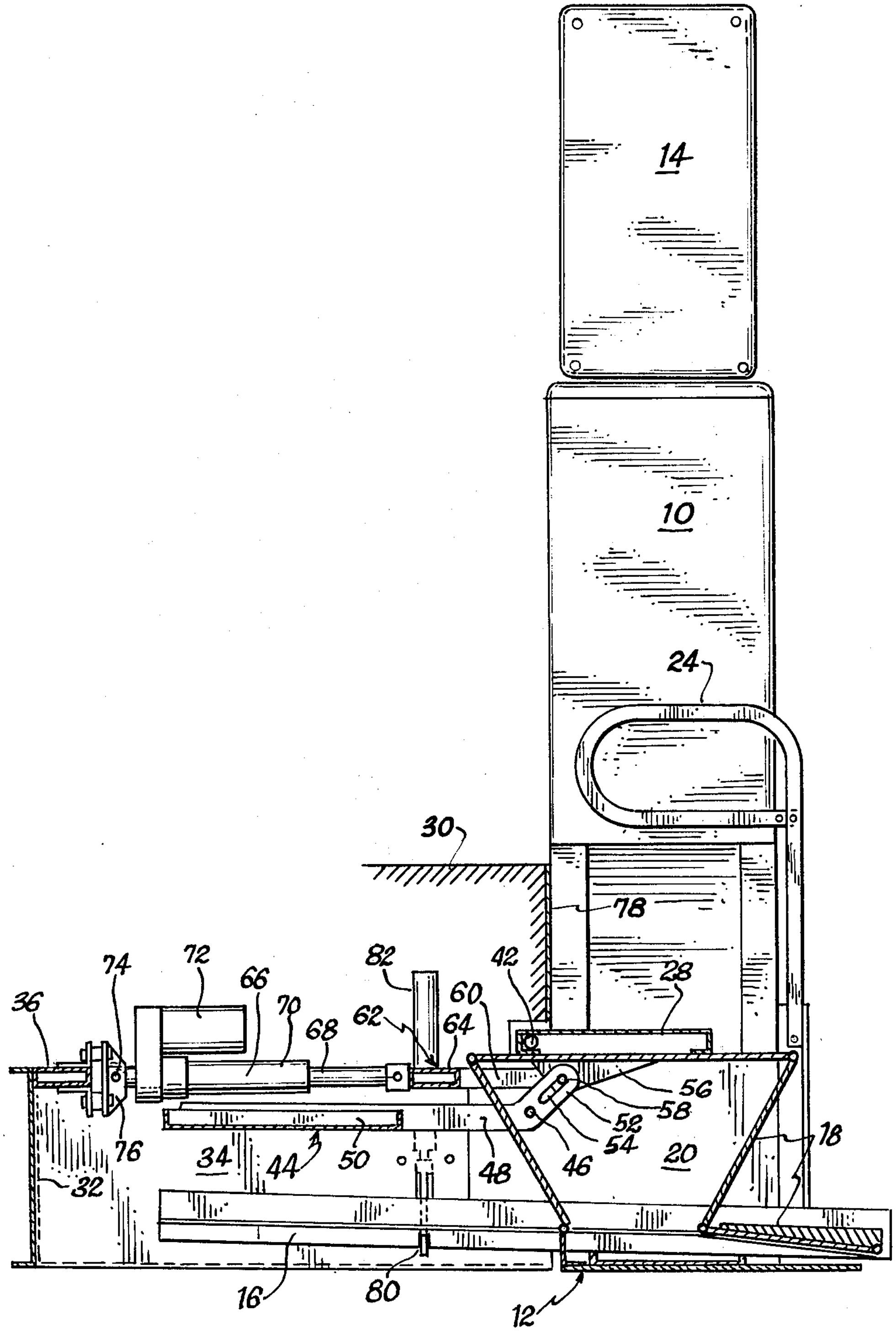
FIG. 1 is an elevation section of the auxiliary step mechanism in place behind a lift, shown in the stow position.
Figure 2:
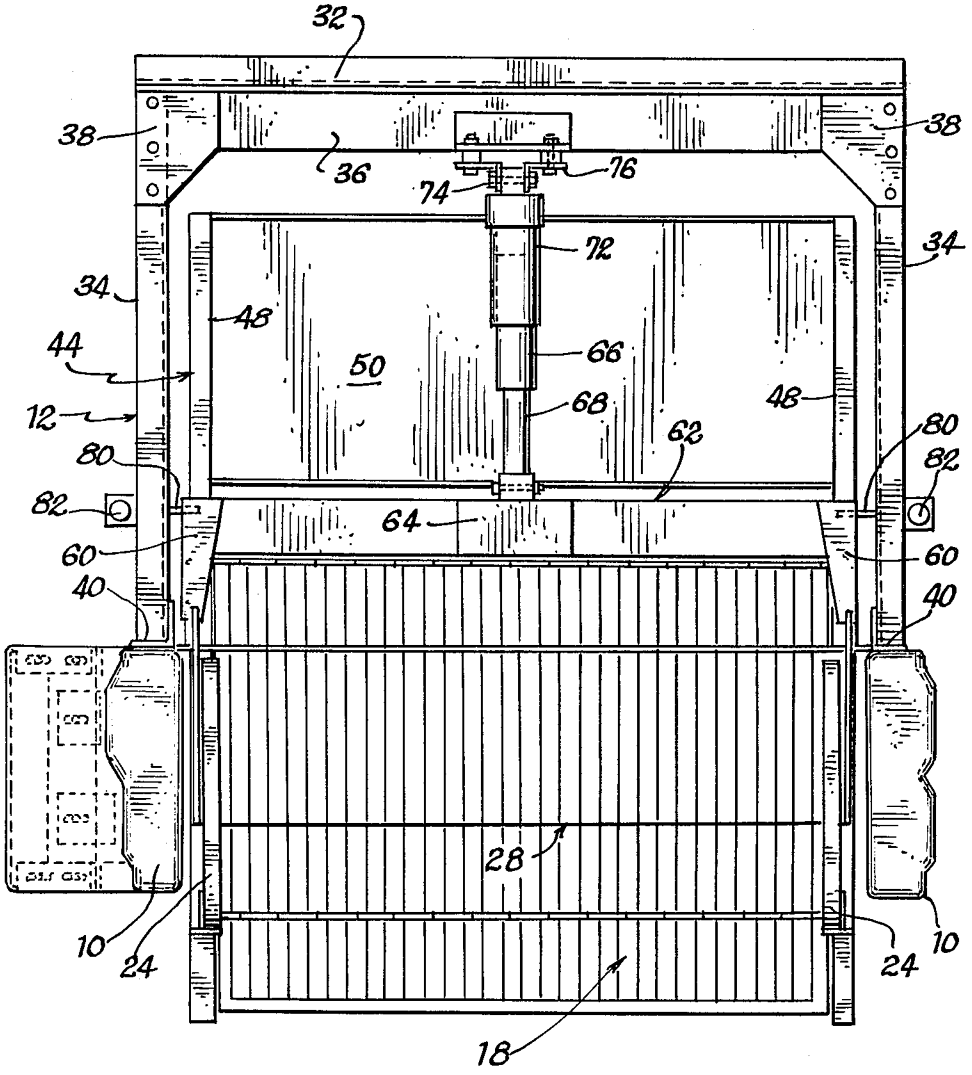
FIG. 2 is the plan form view of the apparatus of FIG. 1.
Figure 3:
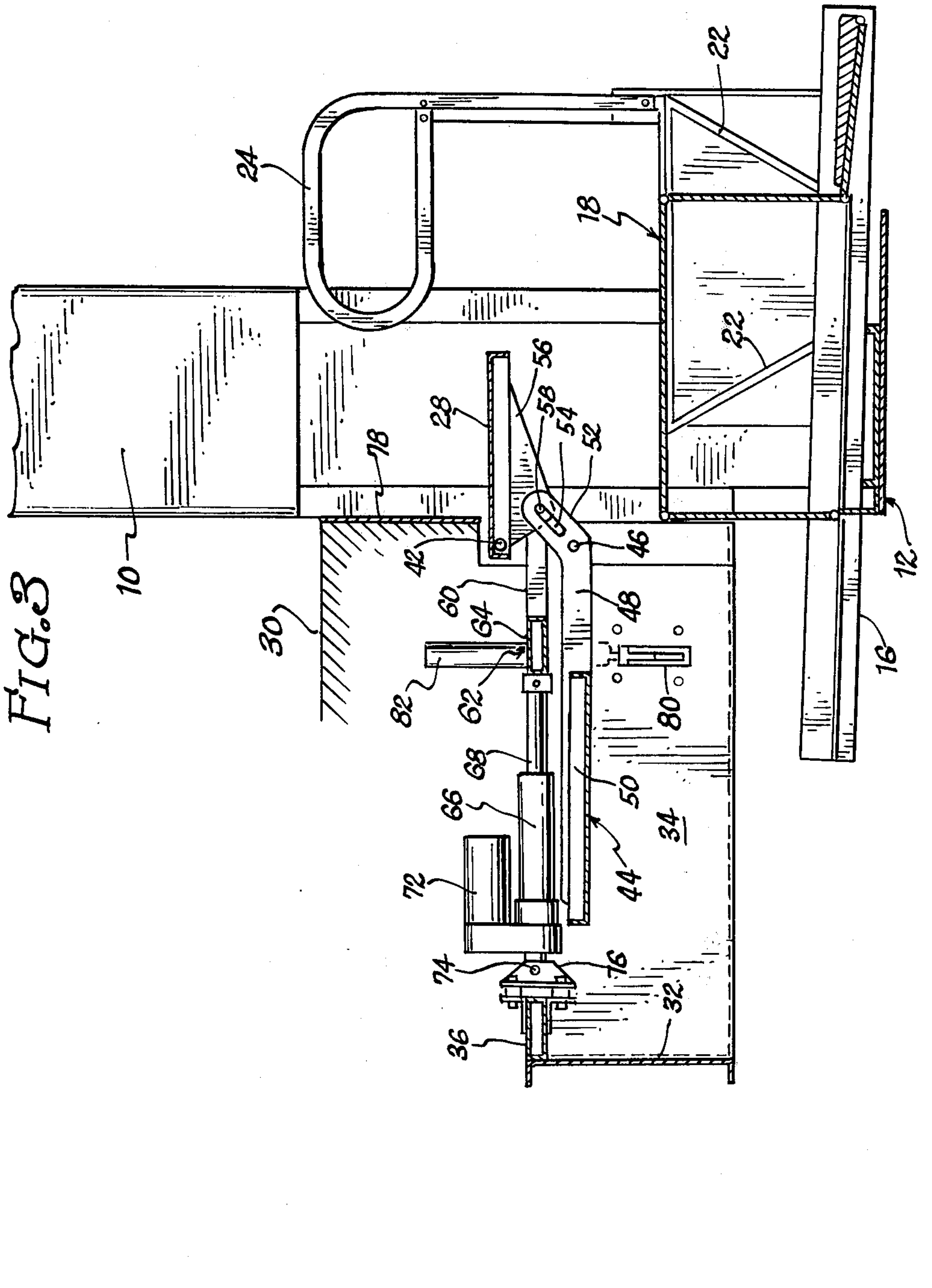
FIG. 3 is an elevation section of the step mechanism in step position.

In FIG. 1, the carriage is completely retracted in the stowed mode. In FIG. 2, the carriage moves out partially to bring forward the step/platform panels 18, which are hinged together end to end in accordian fashion. As the carriage moves out, the trapezodial cross section of the panels changes to a rectangular cross section as indicated in FIG. 3, with the end plates 20 now being forwardly displaced with respect to the stair outline as can be seen from their trapezoidal seals 22. Extending upwardly from these end plates are handrails 24, the upper portion of which is visible in the plan form views of FIGS. 2, 4, and 6.

Moving to FIG. 5, the carriage is extended completely out, bearing the rails 16 in their rear portions, and defining an extended platform 26 instead of the rectangular stair or steps defined by the step/platform panels 18 in FIG. 3.

The retractable step mechanism forming the essence of the invention includes a step element 28 which, as seen in FIGS. 1 and 3, extends forwardly beneath the outermost edge of the passenger support surface 30, ordinarily the floor, of the passenger vehicle. When in its retracted mode as shown in FIG. 5, the step element pivots down generally flushly with the portion of the vehicle immediately beneath the outermost edge of the floor 30.

Figure 4:
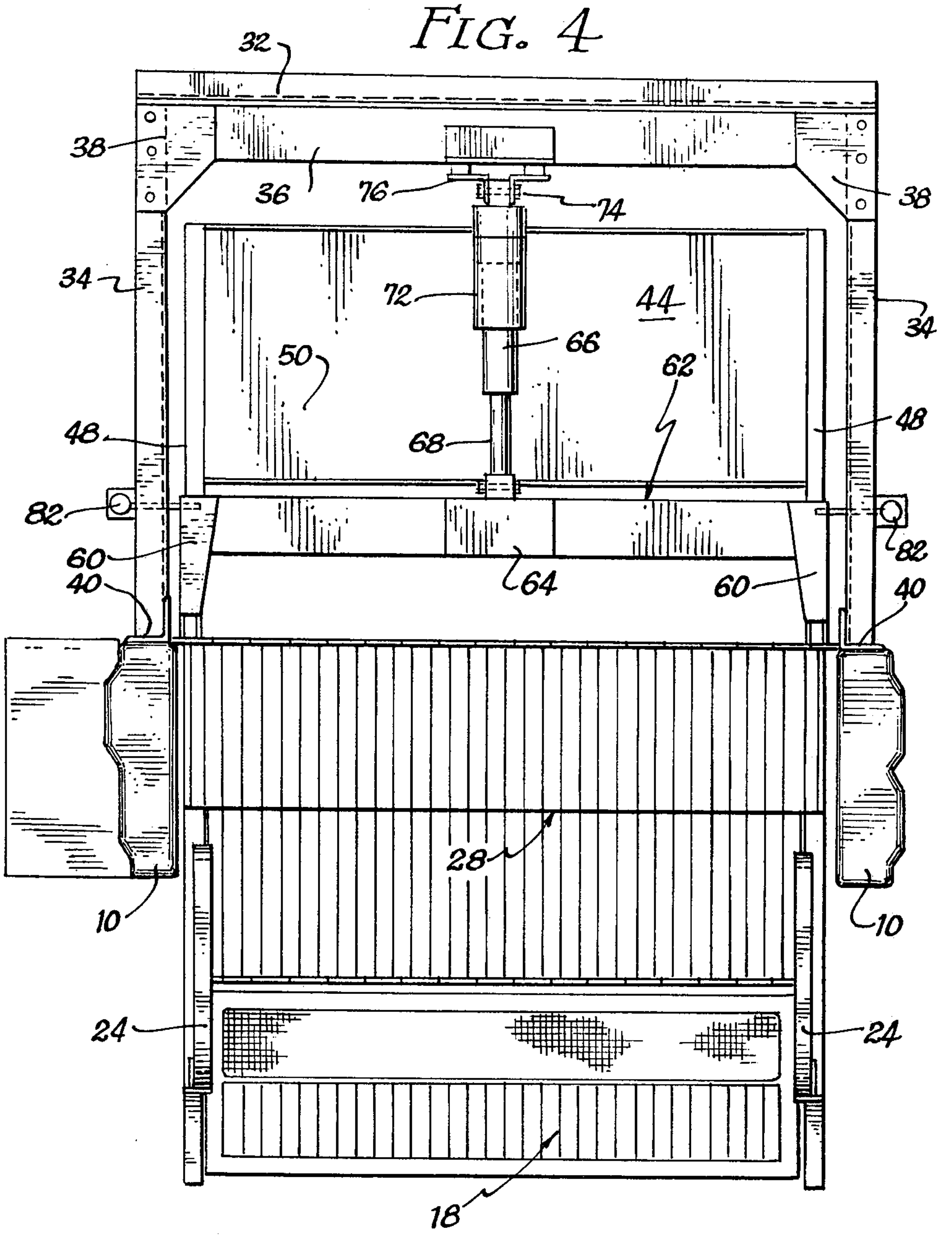
FIG. 4 is a plan view of the apparatus in the mode shown in FIG. 3.

The invention is designed to be rather easily added onto the platform lift structure, and is mounted in a frame that is generally U-shaped, which is best seen in FIGS. 2, 4, and 6 as comprising a rear crossbeam 32 and a pair of forwardly extending side beams 34. These beams may be in the form of open channels, as can be visualized by simultaneous reference to FIGS. 1 and 2. The channels open outwardly on all three sides of the U-shaped frame.

A re-enforcing box beam 36 spans between the side beams in front of the crossbeam, and strength plates 38 are mounted at the junction of the beams as shown.

The forward ends of the side beams 34 terminate inside L-channels 40, which define uprights between which the step element 28 is pivotally mounted at 42. Also mounted between these uprights is a panel 44, pivoted at 46 and comprising elongated side supports 48 which extend rearwardly to mount panel element 50 and dogleg forwardly to define arms 52 which are slotted as indicated at 54. These arms engage arms 56, which are actually flanges depending from the edges of the step element 28. The engagement is by means of a pivot pins 58 which pass through arms 56 and ride in the slots 54. Together the arms and pivot define a linkage mechanism causing the step element and panel to move in unison.

The pivot pins 58 project from the arms or prongs 60 of a yoke 62 which is mounted centrally of its crossbar 64 on the forward end of a linear actuator 66. This actuator could be hydraulic, although the actuator illustrated utilizes a plunger shaft 68 which is driven out of a casing 70 by means of rack and worm gear arrangement powered by an electric motor 72. The linear actuator is pivotally mounted at 74 to a bracket 76 which clamps onto the box beam 36 mounted in front of the crossbar 32.

It can be seen from the drawings and in conjunction with the above description that as the linear actuator 66 extends, the step element 28 and panel 44 swing into the step mode shown in FIG. 1 wherein the step element extends fowardly and the panel is swung rearwardly in a stowed position out of the way of the other elements.

As the actuator is retracted, the pins 58, which extend outwardly from the ends of the prongs 60, draw the step element 28 down into the vertical position shown in FIG. 5, with the panel 44 concomitantly swinging forward into the vertically aligned position also shown in FIG. 5 to define a substantially solid vertical barrier occupying the entire space above the platform 26 and below the short wall panel 78 that depends from the edge of the vehicle floor. The panel and step thus have a dual function, first to provide a third step above the two steps provided by the platform lift, and second to define the vertical barrier which is necessary for the safety of handicapped passengers who are utilizing the lift.

A pair of lift locks 80 are mounted on opposite sides of the frame, being mounted on the outsides of the side beams 34 and operated by the side beams interiorly to lock the carriage 12 in its stowed position as shown in FIG. 1.

The instant invention can be utilized anywhere there is a need for a retractable step which converts into a veritcal barrier extending beyond the area of the step itself, although clearly it is intended for use with the platform lift and is particularly adapted for the platform lift inasmuch as it conveniently moves from the step mode into the vertical barrier mode in which it covers the wide space normally left above the platform when the unit is in its platform mode.

In addition to the transit type vehicles in which the platform lift mechanism is raised for stroage during transit, the platform lift can be used on a motor home or recreational vehicle in which the step structure is deployed as a platform for raising and lowering, but if not lifted is in its step mode. Mounted on a stationary vehicle, the auxiliary step will bridge the distance between floor and ground level where two steps are not enough. The lift will service not only the handicapped, but provides a lift for supplies and equipment as well.

While the preferred embodiment of the invention has been described, other modificaions may be made thereto and other embodiments may be devised within the spirit of the invention and scope of the appended claims.

What is claimed is:

1. A retractable step mechanism alternately deployable in a step mode or in a substantially vertical barrier mode, said mechanism comprising:

a horizontally pivoted step element pivoted between said step mode in which said element is horizontally extended and said barrier mode in which said element is generally vertically extended;

a panel movable between said step mode in which said panel is stowed, and said barrier mode in which said panel aligns with and defines a vertical extension of said step element; and, linkage mechanism linking said step element and panel and confining same to concomitant motion into and between said step and barrier modes, wherein said panel is pivoted on a horizontal axis, said panel and step element each has an extending arm, said arms are linked together to define said linkage means, and one of said arms defines a slot and the other of said arms engages said one arm slidably through said slot to define said linkage mechanism.

2. A retractable step mechanism alternately deployable in a step mode or in a substantially vertical barrier mode, said mechanism comprising:

a horizontally pivoted step element pivoted between said step mode in which said element is horizontally extended and said barrier mode in which said element is generally vertically extended;

a panel movable between said step mode in which said panel is stowed, and said barrier mode in which said panel aligns with and defines a vertical extension of said step element; and, linkage mechanism linking said step element and panel and confining same to concomitant motion into and between said step and barrier modes.

wherein said panel is pivoted on a horizontal axis, said panel and step element each has an extending arm, said arms are linked together to define said linkage means;

said panel is pivoted below said step element, and including a linear actuator operatively connected to said linkage means to operate same and thereby move said step element and panel between said step mode and said barrier mode; and wherein said arms comprise a first arm pair mounted at one end of said panel and step element, and including a second pair of arms mounted at the other end of said step element and panel and connected by a linkage means, and further including a yoke centrally driven by said actuator and having spaced prongs connected to the linkage means of said arm pairs.

3. A retractable step mechanism comprising:

a frame;

a step element pivotally mounted to a forward portion of said frame and being pivoted from a forward horizontally extended step mode to a substantially vertical mode;

a barrier panel pivotally mounted to said frame and being pivotal from a rearwardly extended stowed position in said step mode to a generally vertical position adjacent said step element in said barrier mode; and, means for moving said step element and panel selectably into said step mode or barrier mode;

wherein said panel comprises a panel element and a pair of parallel lateral supports extending parallel with and beyond said panel element and pivoting alongside said step element with said panel element defining a vertical plane extending below said step element when said step element and panel are in said barrier mode.

4. A wheelchair lift assembly for a passenger vehicle comprising:

(a) a retractable step mechanism which when in its step mode defines the next lower step beneath the passenger support service of the vehicle and which constitutes the top step of said lift assembly;

(b) a lower stair apparatus beneath said step and being operative between a step mode defining steps progressively lower than said top step, and a platform mode in which both a platform and a open space above said platform and below said top step is defined at the rear of said assembly; and, (c) means for both pivoting said retractable step down, vertically substantially flush with the outer edge of the vehicle passenger service, and moving a panel into a vertically extended position beneath and aligned with said step such that said retractable step and panel define a vertical barrier substantially occupying said space.

5. Structure according to Claim 4 wherein said step and panel are both pivotally mounted on horizontal axes and connected with a linkage mechanism requiring their concomitant movement when defining said vertical barrier.

6. Structure according to claim 5 such that said panel is swung rearwardly clear of said step when the latter is in the step mode.

7. Structure according to claim 4 wherein said stair assembly nests up underneath said step in a retracted mode, and said means for pivoting connects to the lateral ends of said step and panel spanning said stair assembly such that same provides no obstruction to said stair assembly.

* * * * *